Figure 4:
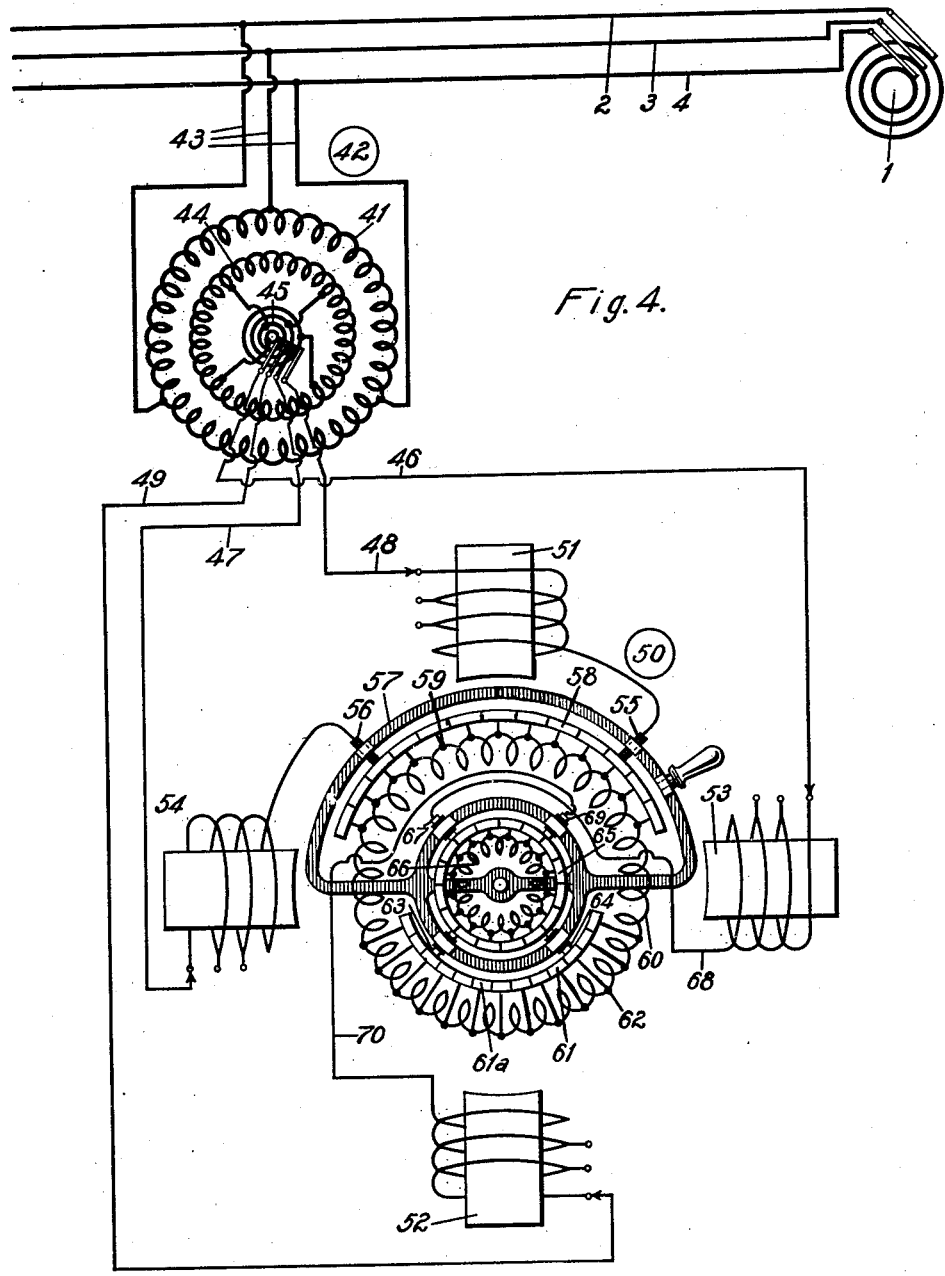

C. LE G. FORTESCUE.
PHASE BALANCER.
APPLICATION FILED NOV. 7, 1916.
1,376,420.
Patented May 3, 1921.
2 SHEETS—SHEET 1.
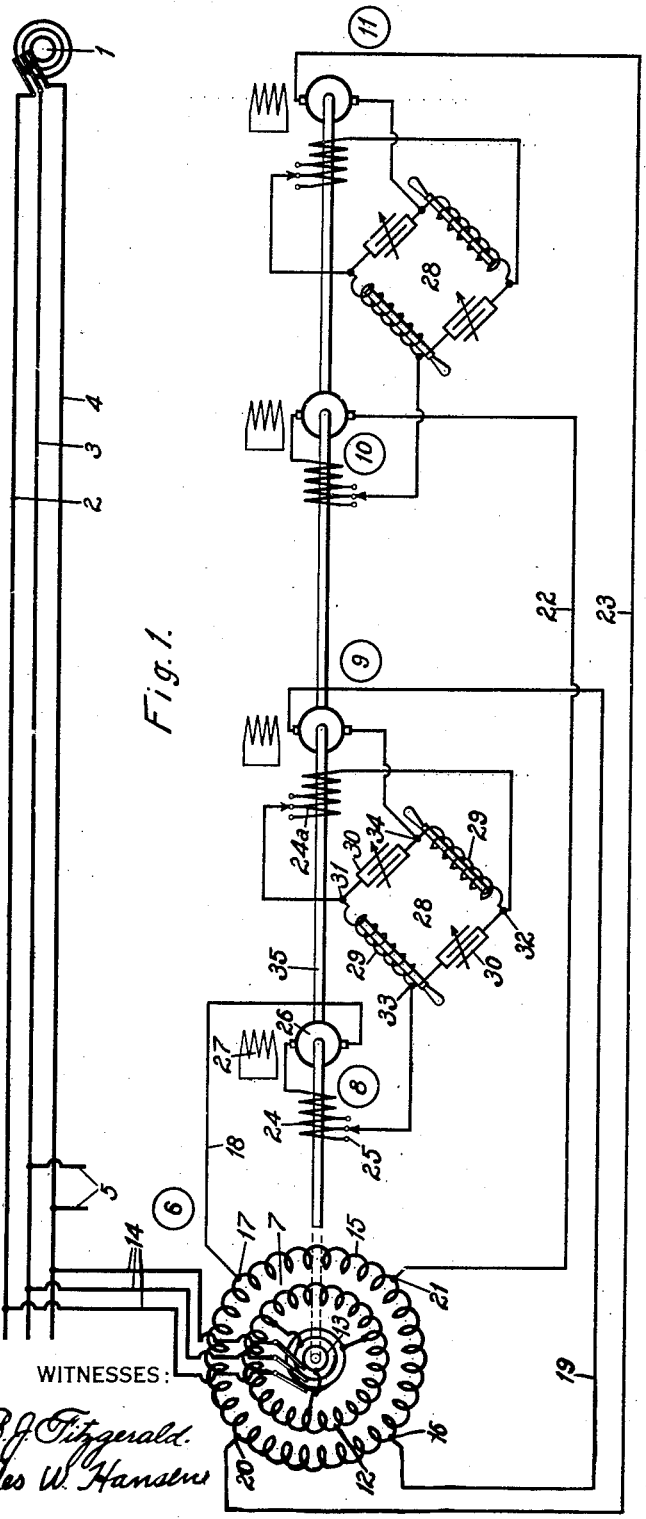
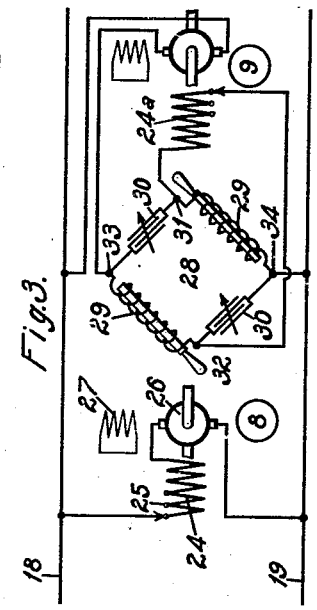
WITNESSES:
O. J. Fitzgerald.
Geo. W. Hansen.
INVENTOR
Charles Le G. Fortescue.
BY
Chesley G. Carr
ATTORNEY

UNITED STATES PATENT OFFICE.

CHARLES LE G. FORTESCUE, OF PITTSBURGH, PENNSYLVANIA, ASSIGNOR TO WESTINGHOUSE ELECTRIC & MANUFACTURING COMPANY, A CORPORATION OF PENNSYLVANIA.

PHASE-BALANCER.

1,376,420.　　　Specification of Letters Patent.　　Patented May 3, 1921.

Application filed November 7, 1916. Serial No. 129,976.

*To all whom it may concern:*

Be it known that I, CHARLES LE G FORTESCUE, a subject of the King of England, and a resident of Pittsburgh, in the county of Allegheny and State of Pennsylvania, have invented a new and useful Improvement in Phase-Balancers, of which the following is a specification.

My invention relates to electrical distributing systems and it has special relation to polyphase transmission systems embodying distributing circuits and phase-balancing means associated therewith for maintaining symmetrical polyphase conditions in the systems.

It is desirable to so select the loads on the several phases of a polyphase-distributing system as to prevent excessive unbalancing of the phase-voltages and currents. Unless such care is exercised, the transmission system will not operate economically and its ultimate load capacity will be considerably reduced. Moreover, polyphase apparatus designed for balanced voltages and currents will be adversely affected when connected to an unbalanced polyphase system. For instance, undesirable temperatures may develop in portions of the polyphase apparatus unless the windings of such apparatus are specially designed to carry unbalanced currents. Again, emergency conditions frequently demand that two or more polyphase systems be interconnected to effect an interchange of electrical energy between them. But it is objectionable and inefficient to do this when one of the systems is considerably unbalanced because the unbalanced system will reflect its unbalanced conditions upon any satisfactorily balanced system which may be connected to it.

It is well known that an ideal phase-balancer will also serve as a phase-splitter or converter to transform a single-phase current into balanced polyphase currents and vice versa. Of course, when performing this function, the phase-balancer is operating under such special conditions as may be represented by a phase-balancer that is connected to a polyphase system in which all of the loads are connected to a single phase thereof, or by a phase-balancer employed to maintain balanced polyphase conditions at a point in a normally balanced polyphase system that is connected to a single-phase system from which part of the power is supplied. While one phase is loaded to the exclusion of the other phases, all of the phases contribute equal amounts of power to the loaded phase through the intermediary of the phase-balancing means and vice versa. Since the phase balancer thus automatically effects an equal division of power among the several phases of a polyphase system, it may also be considered as a phase-splitter or a phase-converter.

One object of my invention is to provide a phase-balancing means of the character above mentioned which will also serve, when special conditions require, as a phase-converter. The phase-balancing means of the present invention will also automatically effect an equal division of the load among the several phases of a polyphase system, irrespective of the loading of the several phases, the power-factors of the loads and other asymmetrical conditions obtaining therein.

For a better understanding of the nature and scope of my invention, reference may be had to the following description and the accompanying drawings in which Figure 1 is a diagrammatic view of a distributing system embodying one form of my invention; Fig. 2 is a diagram showing a booster-type generator that may be substituted for the two booster-generators connected in each phase of one of the windings of the main dynamo-electric machine of my phase balancer; Fig. 3 is a diagram illustrating a modified method of connecting the booster-generators in each phase of one winding of the main machine, and Fig. 4 is a partially diagrammatic and partially sectional view of a modified form of a phase balancer built in accordance with the present invention.

Any unbalanced polyphase electromotive forces or currents, which may be represented by a system of vectors of different magnitudes but capable of forming a closed polygon, may be resolved into two component systems of balanced vectors. One of the component systems of balanced vectors, which I will designate as the load-component, has the same phase rotation as that of the resultant system of unbalanced vectors, and the other component system of balanced vectors, which I will designate as the unbalancing component, has a phase rotation opposite to that of the said resultant system.

In an unbalanced polyphase power system, the unbalancing component of the electromotive forces which, as stated above, constitutes a balanced polyphase system of vectors of phase rotation opposite to that of the system, will be proportional to the product of the corresponding unbalancing component of the polyphase currents and the impedance of the system offered to the flow of these unbalancing-component currents. The relative division of the unbalancing-component of the currents among the various polyphase machines connected to the polyphase system will depend upon the respective impedances of said machine that are offered to the flow of the currents forming the unbalancing component. Synchronous machines and induction motors offer a very low impedance to the flow of these counter-rotating or unbalancing-component currents, and, hence, such devices, connected in the polyphase system at points where there is a concentration of unbalancing load, are liable to be overloaded.

The aforementioned unbalancing component represents the extent of the unbalancing conditions existing in a polyphase system in which the loads of the several phases are not chosen so that each phase of the system supplies equal quantities of power. If polyphase machines connected to the polyphase system were so designed that they offered zero impedance to the unbalancing component of the polyphase currents obtaining in the system, the said machines would serve as ideal phase-balancers since, as will be hereinafter explained, the unbalancing component of the load would be completely eliminated.

When an unbalanced load is supplied from a polyphase system, all the polyphase rotating machines connected to the system tend to act as balancers in order to keep the phase voltages and phase currents in symmetrical relations so that balanced polyphase conditions may be approached at the main bus-bars. In particular, symmetrical polyphase machines of low impedance, such as synchronous motors, rotary converters and induction motors, tend to maintain balanced conditions on a polyphase system independently of the load imposed on them.

To understand the theory of operation of the phase-balancer of the present invention, assume that a single-phase synchronous generator is a polyphase synchronous generator subjected to certain unbalanced load conditions. The polyphase generator supplying the unbalanced load, in this instance, may be considered as being a three-phase generator having zero current flowing in one of its phases and currents equal to the single-phase load-current flowing in any two of the leads, the line current obtaining in one of said leads flowing in a direction opposite to that obtaining in the other lead. The generator comprises a rotating armature winding connected to the unbalanced polyphase system and a stationary field element on which a polyphase amortisseur or auxiliary winding is disposed.

Since, as mentioned above, an unbalanced polyphase load may be resolved into two component loads, one, the load component, having normal phase rotation and the other, the unbalancing component, having counterphase rotation, synchronous rotating magneto-motive forces having normal phase rotation and syncronous rotating magneto-motive forces having counter-phase rotation are generated within the machine by reason of the unbalanced currents obtaining in said armature winding. The synchronous rotating magneto-motive forces of normal phase rotation are stationary with respect to the said amortisseur winding, while the counter-phase rotating magneto-motive forces, which have the same direction of rotation as that of the armature winding relative to the amortisseur winding, generate double-synchronous-frequency currents in the amortisseur winding. The double-frequency currents thus induced generate polyphase magneto-motive forces which approximate, in value, the magneto-motive forces generated by the unbalancing-component currents flowing in the armature winding. However, the magneto-motive forces generated by these induced currents in the amortisseur winding are not exactly equal to the magneto-motive forces inducing them, because the magnetic coupling or mutual induction between the main or armature winding and the amortisseur winding is not entirely perfect. If it were possible to make this magnetic coupling completely perfect, and if the resistances of the amortisseur and armature windings did not impede the flow of the unbalancing-component currents, no reactions to these counter-phase rotating currents would exist and, therefore, the electro-motive forces of the generator would be balanced.

From the foregoing analysis of a single-phase generator, it is evident that a single-phase impedance comprises two elements, namely, the effective impedance of the generator, considered as a polyphase machine, to the normal-phase rotating or load component and the effective impedance to the counter-phase rotating or unbalancing component of the load. The former is the impedance of the machine offered to the flow of symmetrical polyphase currents of positive phase rotation and the latter is the impedance of the machine offered to the flow of symmetrical polyphase currents of counter-phase rotation.

The impedance offered by a dynamo-electric machine to the flow of counter-phase rotational currents may be made extremely low by carefully designing the aforementioned polyphase amortisseur or damper winding. If, in addition, auxiliary means be provided, externally or internally of the machine, to assist the natural action of the machine as a phase-balancer, the admittance of the machine to the counter-phase rotational or unbalancing component currents may be made infinite so that the terminal voltages of the machine will be absolutely balanced irrespective of the values of the counter-phase rotational currents tending to flow through the machine.

The ability of an ordinary dynamo-electric machine, such as a polyphase induction machine or a polyphase synchronous machine, to perform the functions of a balancer is measured by the impedance offered by the machine to the counter-phase rotational component of the unbalanced load. Therefore, the action of such an unassisted machine, when connected to an unbalanced polyphase system, consists in supplying counter-phase rotational currents of such values or the unbalancing component of the load in such an amount as will bring the system and the machine to the same degree of unbalancing. The voltage balance of the system is thereby improved at the expense of the voltage balance of the machine. The voltages that cause unbalancing at the machine terminals are the impedance-drops resulting from the counter-phase rotational currents supplied by the machine and are, therefore, counter-phase rotational symmetrical polyphase voltages. Therefore, if means are provided for reducing the effective impedance offered to the flow of the unbalancing component of the currents in the polyphase system to zero, the phases of said system would be strictly maintained in symmetrical relationship.

By means of my present invention balanced polyphase conditions may be maintained in a polyphase distributing system by neutralizing the magneto-motive forces set up in a machine by the unbalancing component of the load. As a result, the reactions occasioned by the unbalancing component of the load will be reduced to zero. In order to neutralize the magneto-motive forces resulting from this unbalancing component of the load and thereby maintain only symmetrical polyphase conditions in the supply system, I provide a phase balancer that comprises a main dynamo-electric machine having one of its windings adapted for connection to the polyphase transmission system and a second winding in inductive relation thereto. Means are connected in series with said second winding for generating alternating electromotive forces that are in proper phase relationship with, proportional to, and of the same frequency as, the alternating currents induced in said second winding by reason of the unbalancing-component currents traversing the said first winding. The electromotive forces thus introduced into the said second winding amplify the value of the induced currents in order that the impedance offered by the main machine to the flow of the unbalancing component currents may be reduced to zero. As a result, the terminal voltages of the main machine of the phase balancer are maintained in a perfect symmetrical relation irrespective of the unbalancing obtaining in the distributing system.

Other features of novelty in my invention will be pointed out with particularity in the claims annexed to, and forming a part of, this specification.

Referring to Fig. 1, a source 1 of alternating-current supply is connected to polyphase mains 2, 3 and 4 of an electrical-transmission system. Unbalanced-load conditions may be imposed on this distributing system, for example, by connecting translating devices to a single-phase feeder 5 that is connected across the mains 3 and 4 of the distributing system. The loads obtaining in the feeder circuit 5 tend to lower the voltage between the mains 3 and 4. At the same time that the unbalanced voltage conditions obtain, unbalanced current conditions in the several phases of the distributing system will exist.

In order to correct this unbalancing of the voltage between the distributing mains, I provide a phase balancer 6 which, in this instance, comprises a main dynamo-electric machine 7 and auxiliary dynamo-electric machines 8, 9, 10 and 11. A polyphase winding 12, mounted upon the rotor of the main machine 7, is connected, through slip rings 13 and leads 14, to the distributing system. A second polyphase winding 15, here shown as a two-phase winding and in inductive relation to the winding 12 is mounted upon the stator of the main machine. The main machine 7, in this instance, is shown as an induction-type alternator in which the speed of rotation of the rotor winding 12 is less than that corresponding to synchronous speed. One phase of the stationary winding 15, which is connected to taps 16 and 17, is connected in series relationship with the commutator-type series boosters 8 and 9 by means of leads 18 and 19. Similarly, the other phase of the winding 16, which is connected to taps 20 and 21, is connected in series relationship with the series commutator-type boosters 10 and 11 by means of conductors 22 and 23. Since the circuits associated with the several phases of the winding 15 are similar, I will describe only the circuit comprising the boosters 8 and 9.

The booster 8 is an alternating-current series dynamo-electric machine of a well known type. It comprises an adjustable exciting field 24 provided with a plurality of taps 25, a commutator cylinder 26 which is connected to its associated armature winding (not shown) and a compensating winding 27 that is shown here as an inductive compensating winding. The machine 8 represents any of the known alternating-current commutator-type series machines which generate alternating-current voltages in their armature windings that are proportional to, in phase with, and of the same frequency as, their field-exciting currents.

The machine 9 is similar, in all respects, to the machine 8 and is connected in series circuit therewith through a phase transforming device, shown as a bridge or equivalent static network 28. The bridge 28 comprises adjustable inductive reactors 29 and adjustable condensive reactors 30, the inductive reactors being connected alternately in a closed circuit with the condensive reactors. The armature of the machine 9 is connected in series with the inducing diagonal of the bridge 28 while the exciting field 24ª is connected to points 31 and 32 across the other diagonal of the bridge upon which the derived voltage is impressed. The bridge 28 generates a voltage that is displaced in phase relation to the inducing voltage and impressed upon the two points 31 and 32 of the bridge. The voltage obtaining across the points 31 and 32 of the bridge may be displaced at right angles to the voltage obtaining across points 33 and 34 of the bridge. The several reactances 29 and 30 are adjustable so that the proper electromotive force, both in magnitude and phase, will be impressed upon the field winding 24ª.

As mentioned above, the machines 8 and 9 are connected in series across the phase 16—17 of the winding 15 of the main machine 7. The currents induced in the several phases of the winding 15, by reason of the unbalancing component magneto-motive forces generated in the machine 7, traverse the machines 8 and 9, and the machines 10 and 11. The machines 8 and 9, by being mounted upon a common shaft 35 which is rotated by the rotor of the main machine 7, respectively generate two electromotive forces, that generated by the generator 8 being in phase with the exciting current traversing the field winding 24 and that generated by the generator 9 being in phase with the current traversing the exciting winding 24ª. Two component electromotive forces are therefore induced which, by reason of the machines 8 and 9 being connected in series relationship, form a resultant electromotive force of the proper value, phase displacement and frequency which augments the currents induced in the phase 16—17 of the winding 15 in the manner mentioned above. By varying the taps upon the field windings 24 of the booster-generator 8, the component electromotive force may be varied. The relation between the inducing currents and the generated voltages of the boosters 8 and 9 may be varied but the induced voltages, at all times, will be proportional to the field-exciting currents.

Similarly, the machines 10 and 11, which are connected in series with the phase 20—21 of the winding 15, will generate a resultant voltage having the proper frequency, magnitude and phase position to augment the currents induced in the associated phase of the main machine 7. Under ordinary conditions, the resultant voltages severally obtained in each phase from the two alternating-current boosters connected in each phase, will be equal in value and maintain, with respect to each other, a fixed phase relationship. However, the phase displacement between the two resultant voltages and the voltages impressed upon the leads 14 will be varied in accordance with the unbalancing in the distributing system.

After the proper adjustments have been once made, the commutator-type series booster-generators 8, 9, 10 and 11 will automatically introduce compensating voltages of the proper magnitude, phase displacement and frequency in the winding 15 in order to maintain substantially symmetrical conditions in the distributing system. The alternating-current electromotive forces induced in the booster-generators will have the proper frequency since they will, at all times, have the same frequency as that of the currents obtaining in the field windings 24 and 24ª.

For a more detailed description of the construction and operation of the bridge device 28, reference may be had to my copending application Serial No. 83,748, filed March 13, 1916, patented Nov. 12, 1918, No. 1,284,293.

In Fig. 2, I have shown a structure that may be substituted for the two machines connected in series with each phase of the polyphase windings 15 of Fig. 1. A booster-generator 36 that may be substituted for the machines 8 and 9 of Fig. 1, comprises an adjustable exciting winding 37 that is connected directly in series with the main 18 and a second adjustable exciting winding 38 which is connected across the points 31 and 32 of the bridge 28. A single commutator cylinder 39 is connected in series relationship with the main 18, the field winding 37, the bridge 28 and the main 19 by means of brushes 40. The armature winding (not shown) of the machine 36 is, therefore, subjected to two alternating-current fields having the same frequency, the one generated by the currents traversing the winding 37 and the other generated by the currents traversing the winding 38. The currents obtaining in the winding 38 are displaced in phase from the voltages impressed across the points 33 and 34 of the bridge. The resultant voltage induced in the machine 36 is, therefore, of the proper phase, magnitude and frequency and corresponds to that which may be obtained by the joint action of the machines 8 and 9. In a similar manner, the machines 10 and 11 may be replaced by a single machine that corresponds to the machine 36.

Since this structure is more specifically described and claimed in a divisional application, Serial No. 232,148, filed May 2, 1918, no more detailed description of the same will be given herein.

In Fig. 3, the booster-generator 8 is directly connected across the mains 18 and 19, and the booster-generator 9 is connected across the mains through the bridge 28. The bridge 28, in this instance, is excited by a voltage in phase coincidence with the voltage impressed across the mains 18 and 19. The voltage impressed upon the field winding 24ᵃ of the machine 9 is displaced at right angles to the voltage across the mains since the bridge 28 is so tuned as to impart this phase displacement to the voltage across the derived diagonal of the bridge. Therefore, the voltage generated by the machine 9 is at right angles to that generated by the machine 8. These two voltages are the components of the resultant voltage to be impressed across the phase 16—17 of the winding 15 of the main machine, the power-component voltage being generated by the machine 8 and the wattless component being generated by the machine 9.

In the system shown in Fig. 4, a stationary polyphase winding 41 of a phase balancer 42 is connected to the mains 2, 3 and 4 by means of leads 43. The polyphase winding, shown as a two-phase winding, in which the super-frequency alternating currents are induced by reason of the unbalancing-component currents flowing in the winding 41, is shown as a rotating winding 44. The two phases of the rotating winding 44 are connected to slip rings 45 which, in turn, extend to leads 46 and 47 of one phase and 48 and 49 of the other phase.

In order to augment the currents induced in the winding 44 by the unbalancing-component magnetomotive forces obtaining in the main machine, a single auxiliary machine 50 is employed which serves as a substitute for the machines 8, 9, 10 and 11 shown in Fig. 1. The machine 50 is a machine of the alternating-current, series commutator type having a series compensating winding, as will be hereinafter explained. The machine 50 comprises four poles, one pair of poles 51 and 52 having windings that are connected in series with each other and with the leads 48 and 49 and the other pair of poles 53 and 54 having coil windings that are connected in series with each other and with the leads 46 and 47. The windings 51 and 54 are connected, respectively, to brushes 55 and 56 which are disposed ninety electrical degrees from each other and mounted upon a rotatable bracket 57. The brushes 55 and 56 bear upon a sector 58 of a commutating cylinder, the bars of which are severally connected to taps 59 extending to a compensating winding 60. A second sector 61 of a commuting cylinder has its commutating bars 61ᵃ severally connected to taps 62 of the compensating winding. Brushes 63 and 64, displaced ninety electrical degrees from each other and mounted upon the bracket 57, extend between the segment 61 and a rotating commutating cylinder 65 of the machine. An armature winding 66 is connected, at the proper points, to the segments of the commutating cylinder 64 which, in turn, is rotated by means of a shaft (not shown) which is common to the rotating winding 44 of the main machine. A current-conducting brush 67, mounted upon the bracket 57, is paired with the brush 64 and, therefore, diametrically placed therefrom to bear upon the commutator cylinder 65. The brush 67 is connected, by means of a lead 68, to the field coil 53. Similarly, a brush 69, mounted upon the bracket 57 and paired with the brush 63, is connected, by means of a lead 70, to the field coil 52.

The machine 50 is essentially two alternating-current, commutator-type boosters and generates two electromotive forces that are displaced ninety degrees in phase from each other and are proportional to the alternating currents severally exciting the two field windings. For instance, the field coils 51 and 52 constitute the exciting means for that portion of the alternator connected in the phase 48—49 of the winding 44 and, similarly, the field coils 53 and 54 constitute the exciting means for that portion of the alternator connected in the phase 46—47 of the winding 44.

Since all of the brushes are mounted upon the common bracket 57 which, in turn, is rotatably mounted upon the shaft of the machine 50, the voltages induced in the two phases of the machine 50 will, at all times, be displaced ninety electrical degrees from each other. The phase displacement of these polyphase voltages, with respect to the voltages impressed across the mains 43 of the main machine, may be varied by moving the bracket 57. The voltages induced in each phase of the machine 50 are of the same frequency and proportional to the exciting currents traversing the associated field coils, and the relation between the induced voltages and the inducing current may be varied by varying the taps of the field coils. From the foregoing description, it will be apparent that the machine 50 serves as two alternating-current boosters having separate field-exciting coils and a common compensating winding, a common commutating cylinder and a common armature. The electromotive forces generated by the machine 50 and introduced into the winding 44 of the main machine amplify the currents induced therein to completely neutralize the magnetomotive forces obtaining in the main machine by reason of the unbalancing conditions in the distributing system. In consequence thereof, the impedance offered by the main machine to the flow therethrough of the unbalancing-component currents is maintained at zero under all conditions.

The general theory involved in the operation of the phase-balancing means disclosed herein is described and claimed in my copending application Serial No. 123,031, filed September 30, 1916.

While I have shown my invention in a plurality of forms, it will be obvious to those skilled in the art that it is not limited to these specific forms but is susceptible of various changes and modifications that do not depart from the spirit and scope thereof. I desire, therefore, that only such limitations shall be placed upon my invention as are imposed by the prior art or fall within the scope of the appended claims.

I claim as my invention:

1. A phase balancer comprising a polyphase dynamo-electric machine having one of its windings adapted for connection to a normally unbalanced polyphase system, a second winding in inductive relation thereto in which super-frequency alternating voltages are induced by the unbalancing-component currents traversing the said first winding, and means influenced by the resulting induced super-frequency currents for inherently amplifying the values of the said induced voltages in order to substantially reduce the effective impedance offered to the flow of the unbalancing-component currents by the dynamo-electric machine to zero.

2. A phase balancer comprising a polyphase dynamo-electric machine having one of its windings adapted for connection to a normally unbalanced polyphase system, a second polyphase winding in inductive relation thereto in which super-frequency alternating voltages are induced by the unbalancing-component currents traversing said first winding, and an alternating-current, commutator-type booster connected in series with the phases of said second winding in order to inherently amplify the super-frequency alternating voltages induced therein, said booster having such characteristics as to substantially reduce the effective impedance offered to the flow of the unbalancing component currents by said dynamo-electric machine to zero.

3. A phase balancer comprising a polyphase dynamo-electric machine having a polyphase winding adapted for connection to a normally unbalanced polyphase system, and a second polyphase winding in inductive relation thereto in which super-frequency alternating currents are induced by the unbalancing-component currents traversing said first winding, and means influenced by the currents obtaining in each phase of said second winding for inherently amplifying said currents by such amounts that symmetrical polyphase conditions may be maintained in said first winding under all conditions and the effective impedance offered by said dynamo-electric machine to unbalancing component currents may be reduced to zero.

4. A phase balancer comprising a main polyphase dynamo-electric machine, and means for inherently generating alternating electromotive forces that are in phase with, proportional to, and of the same frequency as, the alterating currents impressed thereupon, said means being connected to the said main machine and having such characteristics as to neutralize the unbalancing-component magneto-motive forces obtaining therein by reason of the unbalanced-component currents traversing its windings.

5. A phase balancer comprising a main polyphase dynamo-electric machine, and booster-means connected in series with one of the windings of said main machine, said booster-means inherently generating electromotive forces that are in phase with, in proportion to, and of the same frequency as, the alternating currents impressed thereupon, the aforementioned electromotive forces being of such values as to substantially reduce the effective impedance offered by said dynamo-electric machine to unbalancing component currents to zero.

6. A phase balancer comprising a main dynamo-electric machine having one of its windings adapted for connection to a polyphase system and a second winding in inductive relation thereto, booster-means connected in series with said second winding, said booster-means generating electromotive forces that are in phase with, proportional to, and of the same frequency as, the alternating currents impressed thereupon in order to substantially balance the currents in said polyphase system.

7. A phase balancer comprising a main polyphase dynamo-electric machine having one of its windings adapted for connection to an alternating-current distributing system and a second polyphase winding in inductive relation thereto, and booster-means connected in each phase of said second winding, said booster-means generating alternating voltages that are in phase with, proportional to, and of the same frequency as, the alternating currents impressed thereupon, whereby the magneto-motive forces generated by the unbalancing-component currents in said second winding may be amplified to substantially neutralize the magneto-motive forces generated by the unbalancing-component currents traversing said first winding.

8. The combination with a polyphase system, of a phase balancer comprising a main polyphase dynamo-electric machine, and alternating-current, commutator-type booster-generators connected with the several secondary phases of the said main machine and generating alternating voltages in phase coincidence with, proportional to, and of the same frequency as, the currents traversing said booster-generators in order that the current balancing action of the main machine may be amplified.

9. The combination with a polyphase system, of a phase balancer comprising a main polyphase dynamo-electric machine, means for independently generating watt-component and wattless-component electromotive forces and for introducing these components in each secondary phase of said main machine, and means for varying the value of each component in order to amplify the current balancing action of said main machine.

10. The combination with a polyphase system, of a phase balancer comprising a main polyphase dynamo-electric machine, two alternating-current, commutator-type, booster-generators connected in the several secondary phases of said main machine, one of said booster-generators generating a power-component electro-motive force and the other generating a wattless-component electromotive force, and means for varying the value of each component electromotive force in order to amplify the balancing action of said main machine.

11. A phase balancer comprising a main polyphase dynamo-electric machine, auxiliary sources of electromotive forces connected in each secondary phase thereof, said sources generating electromotive forces that are displaced ninety degrees from each other, and means for adjusting the values of said electromotive forces whereby the current balancing action of said main machine may be amplified.

12. The combination with an inductive machine having a wound secondary, of auxiliary booster means in series with said secondary, said means including a commutator-type dynamo-electric machine aggregate having armature windings and a plurality of exciting field windings, said armature windings being connected in series circuit relationship with said secondary, and a phase converter connected in series circuit relationship to said armature circuit, one of said exciting field windings being connected in series circuit relationship to said armature circuit, and another of said exciting field windings being connected to the derived phase of said phase converter.

13. The combination with an induction machine having a wound secondary, of auxiliary booster means in series with said secondary, said means including a commutator-type dynamo-electric machine aggregate having armature windings and a plurality of exciting field windings, said armature windings being connected in series circuit relationship with said secondary, and a two-phase static network having one of its phases connected in series circuit relationship to said armature circuit, one of said exciting field windings being connected in series circuit relationship to said armature circuit, and another of said exciting field windings being connected to the derived phase of said static network.

In testimony whereof I have hereunto subscribed my name this 31st day of Oct., 1916.

CHARLES LE G. FORTESCUE.